(12) United States Patent
Waldmann et al.

(10) Patent No.: US 8,035,494 B2
(45) Date of Patent: Oct. 11, 2011

(54) MOTOR VEHICLE CONTROL DEVICE DATA TRANSFER SYSTEM AND PROCESS

(75) Inventors: Alfred Waldmann, Marktoberdorf (DE); Hans-Peter Spiess, Marktoberdorf (DE)

(73) Assignee: AGCO Corporation, Duluth, GA (US)

( * ) Notice: Subject to any disclaimer, the term of this patent is extended or adjusted under 35 U.S.C. 154(b) by 824 days.

(21) Appl. No.: 12/118,366

(22) Filed: May 9, 2008

(65) Prior Publication Data
US 2008/0278282 A1    Nov. 13, 2008

(30) Foreign Application Priority Data

May 11, 2007    (DE) .......................... 10 2007 022 100

(51) Int. Cl.
*B60R 25/10* (2006.01)
(52) U.S. Cl. ............. 340/426.11; 340/539.16; 307/10.6; 307/10.3
(58) Field of Classification Search ............ 340/426.11, 340/539.11, 539.16, 5.6, 5.61, 5.65, 5.85; 380/277; 307/10
See application file for complete search history.

(56) References Cited

U.S. PATENT DOCUMENTS

| | | | | |
|---|---|---|---|---|
| 6,353,776 B1 * | 3/2002 | Rohrl et al. | ............. | 340/426.16 |
| 6,812,829 B1 * | 11/2004 | Flick | ........................ | 340/426.13 |
| 6,956,466 B2 * | 10/2005 | Caretta et al. | ............ | 340/426.11 |
| 7,068,153 B2 * | 6/2006 | Flick | ........................ | 340/426.36 |
| 7,205,679 B2 * | 4/2007 | Flick | ............................ | 307/10.3 |
| 7,224,083 B2 * | 5/2007 | Flick | ............................ | 307/10.6 |
| 7,224,261 B2 * | 5/2007 | Shimomura | ............. | 340/426.11 |
| 7,489,981 B2 * | 2/2009 | Kiuchi et al. | ................. | 700/116 |
| 7,538,655 B1 * | 5/2009 | King | ............................ | 340/5.51 |
| 7,597,250 B2 * | 10/2009 | Finn | ................................ | 235/380 |
| 2003/0187556 A1 * | 10/2003 | Suzuki | ............................ | 701/29 |
| 2004/0239187 A1 * | 12/2004 | Harada | ........................ | 307/10.3 |
| 2005/0086493 A1 * | 4/2005 | Ishidoshiro | .................. | 713/182 |

FOREIGN PATENT DOCUMENTS

DE    10008973    9/2001

OTHER PUBLICATIONS

German Examination Report for German Application No. 102007022100.4 dated Jan. 22, 2008.

* cited by examiner

*Primary Examiner* — Benjamin C Lee
*Assistant Examiner* — Peter Mehravari

(57) ABSTRACT

The present invention relates to a motor vehicle control device data transfer system and process. In particular, it relates to such a system and process for the transfer of data, subject to the risk of tampering, from a central data-processing device (12) at the motor vehicle manufacturer's to a motor vehicle data-processing device (5), such as an electronic drive engine control device, in which tamper-free data transfer is guaranteed. In this connection, an authentication enquiry value is generated by the vehicle data-processing device (5) and transferred to the central data-processing device (12) by means of a mobile data-processing device (9). This generates an authentication response value, which is transferred back by the same route with release data.

32 Claims, 5 Drawing Sheets

MOTOR VEHICLE CONTROL DEVICE DATA TRANSFER SYSTEM AND PROCESS

CROSS REFERENCE TO RELATED APPLICATION

This application is based on, and claims the benefit of priority to, German application DE 10 2007 022 100.4, filed 11 May 2007, which priority application is hereby incorporated by reference.

BACKGROUND OF THE INVENTION

1. Field of Invention

The present invention relates to a motor vehicle control device data transfer system and process. In particular, it relates to such a system and process for the transfer of data, subject to the risk of tampering, from a central data-processing unit at the motor vehicle manufacturer's to a motor vehicle data-processing unit, such as an electronic vehicle drive engine control device, in which tamper-free data transfer is guaranteed.

2. Description of Related Art

From the prior art, motor vehicles are known, in particular agricultural utility vehicles, such as agricultural tractors, with combustion engines, in particular Diesel engines. The individual component parts of these, such as the drive engine or immobilizer, are controlled by electronic control devices. With such vehicles it is necessary for these control devices to be programmed with data on completion of manufacture, in order to bring the vehicle into an operational state. With the example of a drive engine control device and an immobilizer control device, this means on the one hand that the immobilizer control device is programmed with features of permitted ignition keys. On the other, it means that the drive engine control device is programmed with a communication code for communicating with that immobilizer control device from which it will exclusively accept a start instruction. In order to prevent unauthorized use of the vehicle, it is necessary that this data transfer satisfies high security requirements and cannot be tampered with or compromised.

In addition to this, the drive engine control device is programmed with control data which in particular represents situation-dependent maximum torque values. These are, for example, functions which, depending on the present engine speed, impose a restriction on the maximum selectable desired torque of the drive engine in respect of different aspects, such as overheating protection, overload protection, emission, or performance class of the drive engine. In addition to this, drive engines of a model series are restricted differently in their performance, in order in this way to obtain models of drive engines which may be of the same structural design but are of different performance output. In order to prevent tampering with performance output or erroneous function of the drive engine by changing the programming of the drive engine control device, during operation of the vehicle a comparison is made between the control data and the reference data stored in the immobilizer control device. In order to prevent an unauthorized or illegal increase in performance output by tampering with the control data, it is necessary that this data transfer satisfies high security requirements and cannot be tampered with or compromised.

Such a secure transfer of this security-relevant data can be carried out relatively easily within a supervised area, such as the manufacturer's factory where the vehicle is made, in particular by organizational measures. However, if reprogramming of the electronic control devices of the vehicle becomes necessary due to a vehicle defect or error function, the vehicle has hitherto had to be taken to such a supervised area if the risk was to be excluded of third parties acquiring unauthorized access to the data to be transferred, or of unauthorized persons being able to tamper with the data transfer. This is the case, for example, if the immobilizer becomes blocked and prevents the operation of the vehicle. With agricultural utility vehicles in particular, which can only be transported with considerable effort, this leads to considerable trouble and costs.

The object of the present invention is to resolve this problem. In particular, it is the object of the present invention to provide a motor vehicle control device data transfer system and process which will allow control data to be transferred to control devices secure against tampering, even if the control devices are not taken to a supervised area.

The object is resolved by a system according to Claim 1 and a process according to Claim 16. Advantageous further embodiments are the subject matter of the sub-claims.

BRIEF SUMMARY OF THE INVENTION

According to one aspect of the invention, a data transfer system for programming motor vehicle control devices is provided, which has: a first data-processing device, which is adapted to store data which is to be protected against unauthorized access, a second data-processing device, and a third data-processing device, which is adapted to receive data which is to be protected against unauthorized access and is to be transferred to the first data-processing device. In this connection, the first data-processing device and the second data-processing device are adapted to be connected to one another via a first transfer device and for data stored in the first data-processing device to be transferred as first transfer data to the second data-processing device. At the same time, the second data-processing device and the third data-processing device are adapted to bring the second data-processing device from an area at the first data-processing device into a spatial area in which the second data-processing device can be connected to the third data-processing device indirectly or directly via a second data transfer device, and to connect the second data-processing device and the third data-processing device indirectly or directly via the second data transfer device and transfer at least a part of the first transfer data from the second data-processing device to the third data-processing device as second transfer data. In this connection, the third data-processing device is adapted to generate an authentication response value from the first transfer data or a part thereof, by means of a generating function. At the same time, the second data-processing device and the third data-processing device are adapted to transfer the authentication response value and data stored in the third data-processing device as third transfer data to the second data-processing device. In this situation the first data-processing device and the second data-processing device are adapted to transfer the authentication response value and the other third transfer data or a part thereof to the first data-processing device as fourth transfer data. At the same time, the first data-processing device is adapted to check the correctness of the authentication response value by means of the first transfer data or parts thereof and to process the fourth transfer data further.

In a further embodiment of the invention, scatter values are generated at least via the third transfer data and the fourth transfer data and are sent together with the individual transfer data. In this way, the risk of the transfer data being altered unrecognized can be prevented.

Proceeding further with the invention, the constituent parts of the data transfer system can be designed in such a way that the first transfer data and the fourth transfer data can be encoded by means of a first encoding mechanism and/or the second transfer data and the third transfer data can be encoded by means of a second encoding mechanism. Here, there is no need for the first encoding mechanism and the second encoding mechanism to be different mechanisms. In this way, not only can it be ensured that the transferred data derives from an authorized location, and was not changed during the transfer, but also that unauthorized persons do not obtain access to the transferred data.

In a further embodiment of the invention, the first and second data-processing devices can be adapted in such a way that an authentication of the first and second data-processing devices is carried out by means of a challenge-response process. In this way, it can be assured that the data transfer system is not compromised by a non-authorized device which may have been tampered with.

In a further embodiment of the invention, the second transfer data is stored in the long term by the third data-processing device or by a data store connected to the third data-processing device. This allows recording of the changes carried out at the first data-processing device.

Preferably, the second transfer data contains identification features of the second data-processing device and/or its user, which allows for these to be recorded. In a situation in which these features are transferred as part of the third transfer data and are then evaluated by the second data-processing device, it can be ensured that the third transfer data is not processed by other second data-processing devices.

BRIEF DESCRIPTION OF THE DRAWINGS

Further features of the invention become apparent from the following description of an embodiment and the accompanying drawings.

DETAILED DESCRIPTION OF PREFERRED EMBODIMENTS

An embodiment of the invention is described hereinafter.

Figure 1:
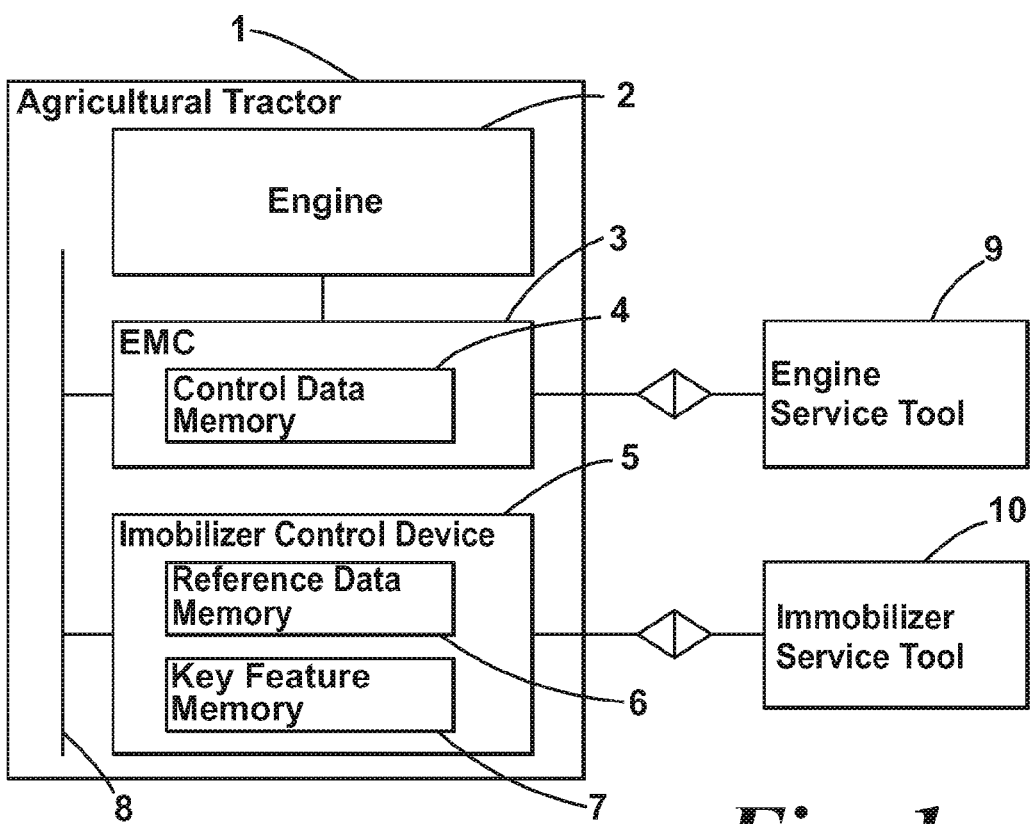
FIG. 1 shows a block circuit diagram of an agricultural tractor with service tools according to an embodiment of the invention.

FIG. 1 shows a block circuit diagram of a part of the data transfer system of the invention according to an embodiment.

The system has an agricultural utility vehicle, in particular an agricultural tractor 1. Part of the agricultural tractor is an engine, in particular a diesel engine 2 with common-rail fuel injection. In the usual manner, by combustion of fuel a rotation of a crankshaft of the diesel engine 2 is produced and transferred to drive wheels, not shown, and to one or more power take-off shafts. A power output or torque from the diesel engine 2 is determined in the first instance by a fuel quantity injected for combustion.

The quantity of fuel to be injected is determined by an electronic engine regulating device 3 (hereinafter "Electronic Motor Control, EMC"; in the claims, "first data-processing device"). The EMC 3 has several interfaces for the input and output of signals. In addition to this, the EMC 3 has a control data memory 4. This control data memory 4 is a non-volatile electronic memory, such as an EPROM or a battery-buffered RAM. The control data memory 4 contains data areas for control data, which in particular represents the situation-dependent permissible maximum torque values. These are, for example, functions which, depending on the engine revolution speed at a particular moment, impose a restriction on the maximum selectable desired torque of the drive engine in respect of different aspects, such as overheating protection, overload protection, emission or performance class of the drive engine. By means of this, drive engines of one model series also have different restrictions placed on their output and in this way drive engine models are obtained which are of the same structural design but have different output capacities. The function which determines a performance class of the drive engine is referred to hereinafter as the ceiling curve. As an alternative, in this case instead of a torque value a fuel quantity, start-up duration, flow rate, power output or a pressure can be used.

In addition to this, the control data memory contains an area for a serial number and a communication code of an immobilizer control device.

The agricultural tractor 1 further contains an immobilizer control device 5 (likewise "first data-processing device"). The immobilizer control device contains a reference memory 6, in which parts of the control data from the control data memory 4 are stored as reference control data. In addition to this, the immobilizer control device has a key feature memory 7, in which features of ignition keys are stored which provide authorization to start the agricultural tractor 1.

EMC 3 and immobilizer control device 5 are connected to one another by means of a CAN bus 8 in such a way that they can transfer data between one another. The integrity of the transferred data is achieved by means of a conventional challenge-response process, forming conventional hash values and conventional symmetrical encoding of the data.

During the start procedure of the agricultural tractor 1, the immobilizer control device 5 identifies a valid ignition key on the basis of its features, and transfers a start clearance signal to the EMC 3. The EMC 3 in turn has stored an identification number of the immobilizer control device 5 and only issues a fuel start volume clearance if it obtains a start clearance transferred from that immobilizer control device with this identification number. During operation of the agricultural tractor 1, the control data in the control data memory 4 is compared with the reference control data from the reference data memory 6, in order to recognize a change in the control data. If a change in the control data is recognized, a power-reducing change in the control data can be effected or further use of the agricultural tractor 1 prevented by blocking the immobilizer.

The EMC 3 is provided with an interface to connect an engine service tool 9. The engine service tool 9 comprises a portable data-processing device, such as a mobile PC, and stores a program for writing to the control data memory 4 of the EMC 3. The program is encoded according to a conventional encoding process and is only decoded when the program is called in the memory.

At the same time, reading the decoded program out from the memory is prevented by means of conventional "debugging" prevention mechanisms. The program checks during run time the features of the portable data-processing device, on the basis of which the identity of the engine service tool 9 can be unambiguously determined. If the identity of the engine service tool 9 corresponds to the identity of an authorized device, execution of the program continues; otherwise, the program will be interrupted. In this way, it is ensured that the program cannot be transferred by simple copying to another data-processing device. In addition to this, the program monitors its run time. If its run time lies within a permitted interval, execution of the program continues; otherwise the program will be interrupted. This therefore ensures that, if a program is compromised, it will only remain usable for a limited time. The program records the identity and authenticity of a user of the engine service tool 9. If the identity of the user corresponds to that of a user authorized by a central location, execution of the program continues; otherwise the program will be interrupted.

An immobilizer service tool 10 can be connected to the immobilizer control device 6. As with the engine service tool 9, this is a portable data-processing device with a program by means of which the immobilizer control device 5 can be programmed or its data memory written to. The program is protected against misuse in the same way as the program of the engine service tool 9.

The programs of the engine service tool 9 and the immobilizer service tool 10 can be stored in a common portable data-processing device or executed as a program. Because the engine service tool 9 and the immobilizer service tool 10 have the same features relevant to the invention or carry out the same steps relevant to the invention, hereafter reference is made only to one common service tool 9 (second data-processing device).

After completing manufacture of the agricultural tractor 1, control data has to written to the control data memory 4 of the EMC 3. To do this, the service tool 9 is connected to the EMC 3 and the program on the service tool 9 is started. At the same time, the EMC 3 is brought by the service tool 9 into a state of learning readiness for an immobilizer control device. This is done by a predetermined key value being transferred to the EMC 3. In the same way, the service tool 9 is connected to the immobilizer control device 5, the reference control data is transferred to the reference data memory 6 and the features of permissible ignition keys are transferred to the key feature memory 7. The immobilizer control device transfers the serial number and the communication code to the EMC 3 and because this is in the learning readiness state these are stored for the long term. The EMC 3 then terminates the learning readiness state.

Figure 2:
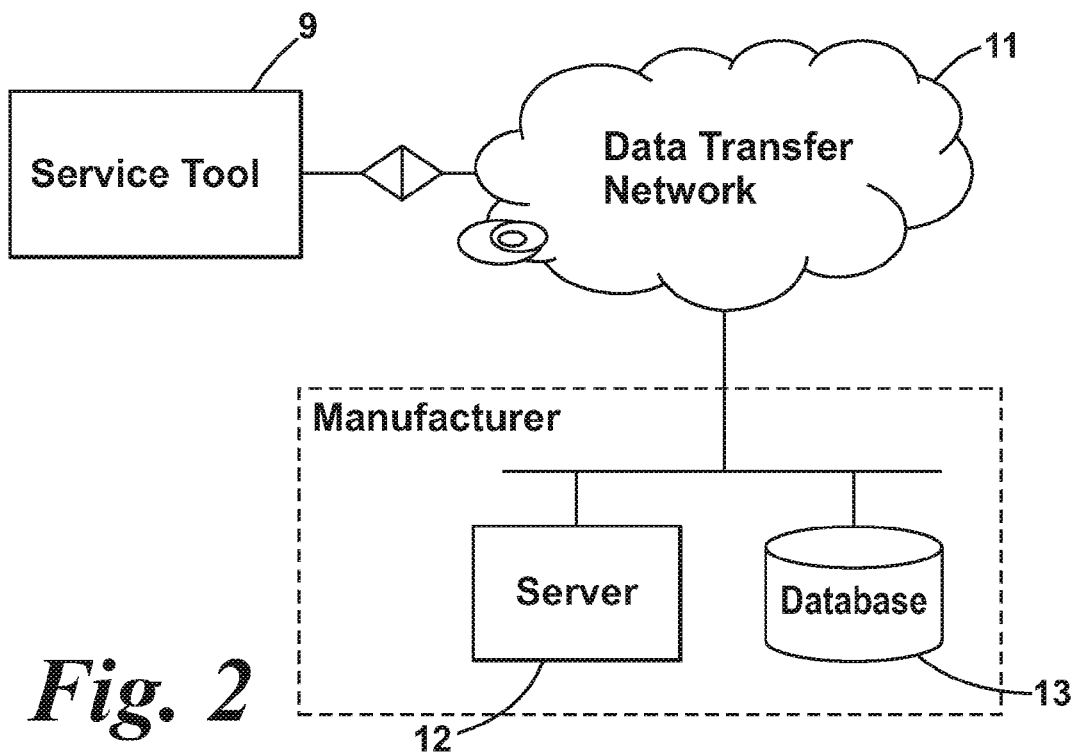
FIG. 2 shows a part of the data-processing system, supplementing FIG. 1, according to the embodiment.

Referring to FIG. 2, further elements of the data transfer system will be described according to an embodiment of the invention.

The service tool 9 has an interface, by means of which it can be connected to a data transfer network 11. Here, the data transfer network 11 can be a wired network, such as a manufacturer's data transfer network, a telephone network or the Internet. It may also be a wireless network such as GSM or UMTS. A central data-processing installation, hereinafter the server 12, is likewise connected to the data transfer network 11. The server 12 is connected via the data transfer network 11 or by other means to a database 13 so that data can be transferred between the server 12 and the database 13.

Figure 3:
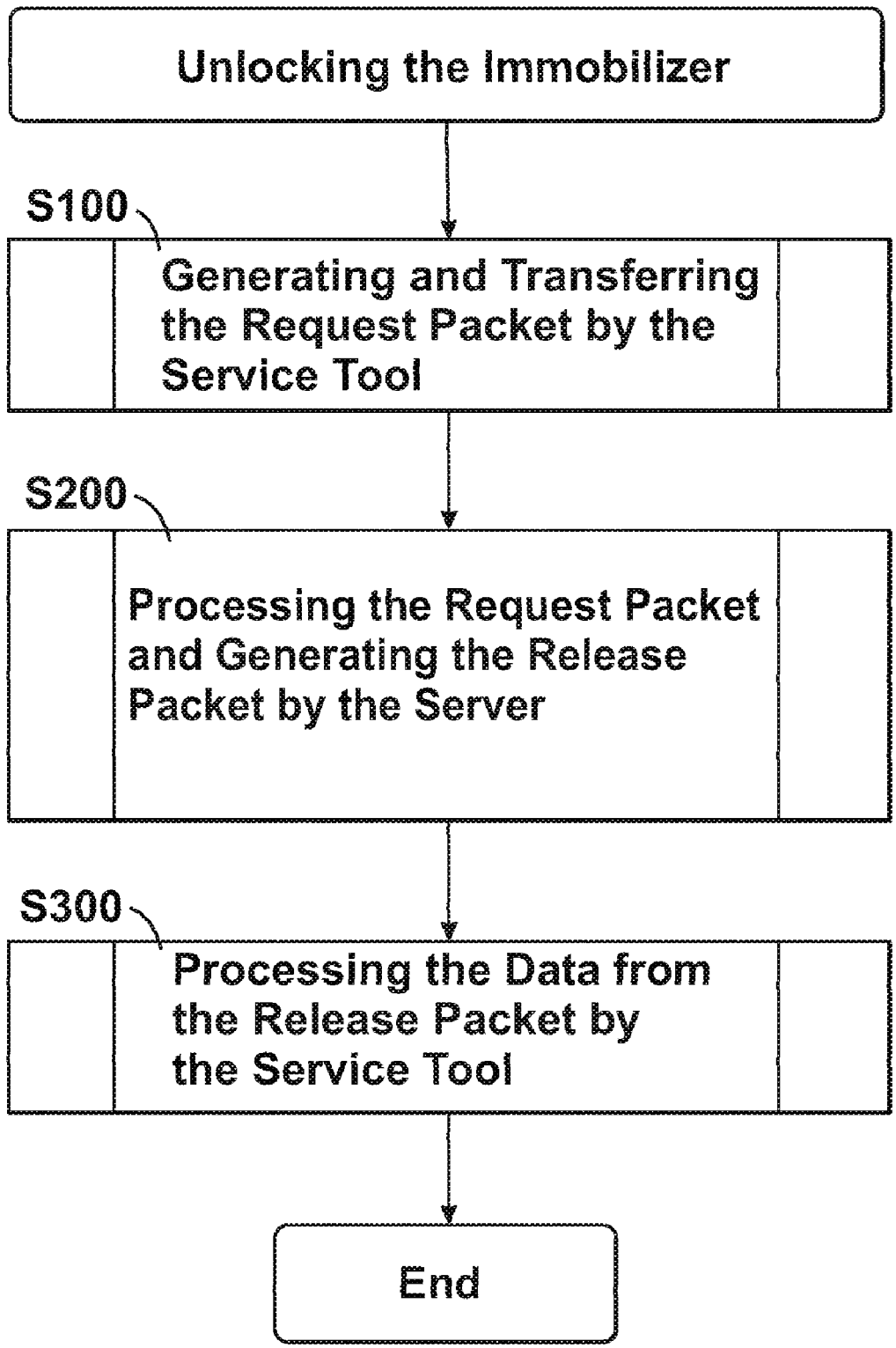
FIG. 3 shows a flow diagram of the data communication of the embodiment.

During the operation of the agricultural tractor 1 after delivery an error function may occur. For example, it may be necessary, due to a defect, for the serial number or the communication code of the immobilizer control device 5 to be stored again in the control data memory 4 of the EMC 3. In addition, it may be necessary, due to the loss of an ignition key or the like, for features of another permissible ignition key to be transferred to the key feature memory 7. Moreover, it could be necessary for the control data in the control data memory 4 and in the reference data memory 5 to be transferred again, in the event of an impermissible deviation being detected during a comparison of control data in the control data memory 4 and reference control data in the reference data memory 6. In this case, the service tool 9 is brought to the location of the agricultural tractor 1 and connected to the EMC 3 and the immobilizer control device 5 and the steps of the flow diagram from FIG. 3 are carried out.

In a step S100, a request packet is generated by the service tool 9, which specifies data required for the eliminating the fault and identifies the agricultural tractor 1.

In a step S200, on the basis of the request packet, a release packet is generated by the server 12, which contains the data required.

In a step S300, the data from the release packet is, depending on the requirement, transferred to the EMC 3 or the immobilizer control device 5 and stored or processed in some other manner.

Figure 4:
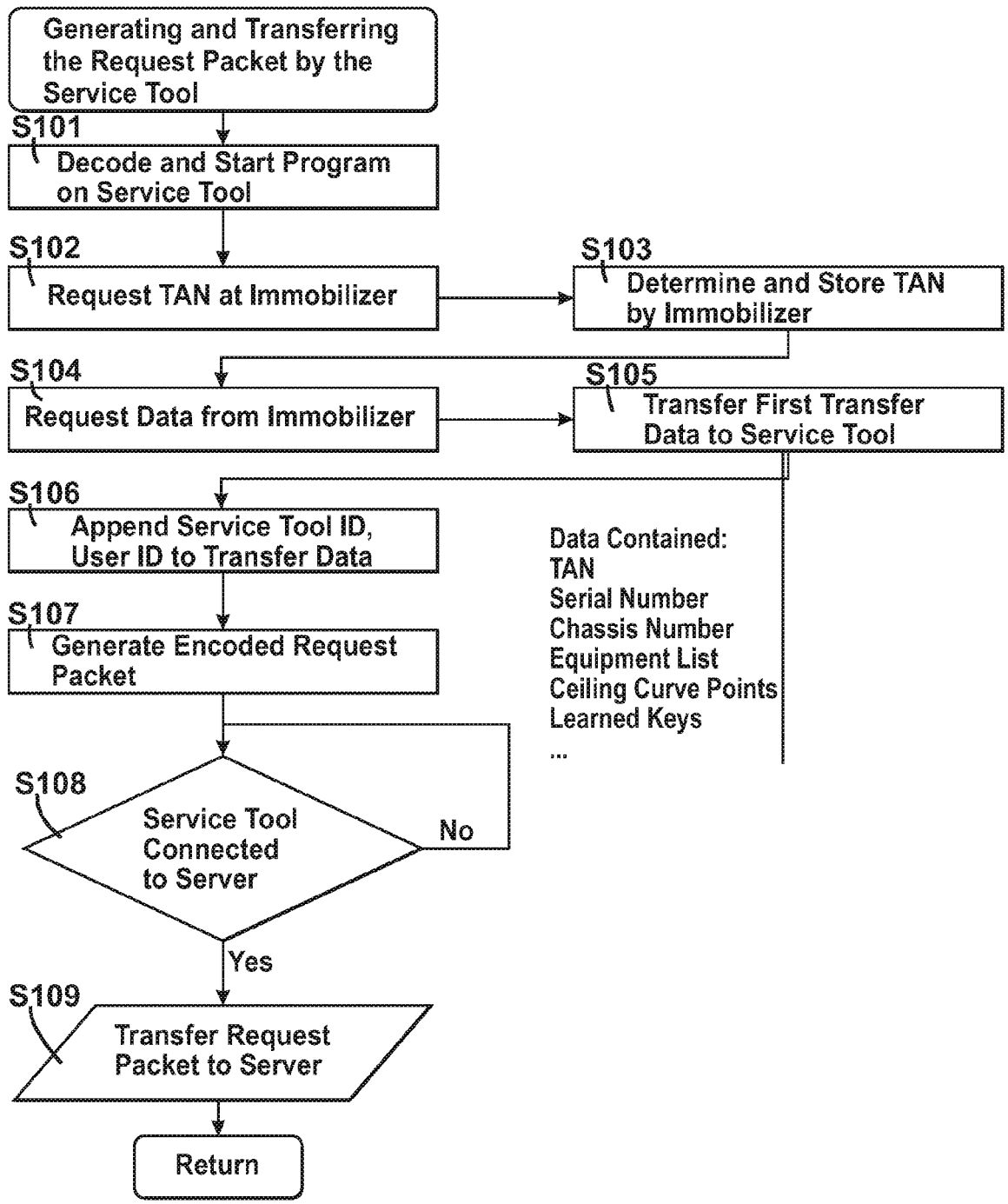
FIG. 4 shows a flow diagram for generating a request packet according to the embodiment.

Referring to FIG. 4, the sequence of the generation and transferring of the request packet by the immobilizer control device 5 will be described.

In step S101 the program is decoded in the service tool 9 and started and a user and his authorization checked. In this case, this is carried out by a user name and a code word being requested which are then compared with a user name and code word stored in the program.

In step S102, in response to the action of the user, generation of a transaction number, hereafter TAN (authentication enquiry value) by the program in the service tool 9 is requested from the immobilizer control device 5.

In step S103 the immobilizer control device 5 determines by means of a conventional mechanism a pseudo-random number (hereinafter random number), a TAN. The TAN is stored in the immobilizer control device 5.

In a step S104 the service tool 9 requests from the immobilizer control device 5 the transfer of the TAN together with other data stored in the immobilizer control device, such as chassis number, key features, serial number of the immobilizer control device, equipment list and control data as first transfer data. For authentication of the service tool 9 and the immobilizer control device 5, a challenge-response process is applied in each case by both sides. This means that the immobilizer control device 5 generates a random number Z1 and the service tool 9 generates a random number Z2. The random number Z1 is transferred to the service tool 9 and the random number Z2 is transferred to the immobilizer control device 5. The service tool 9 encodes the random number Z1 by means of an encoding process, such as XTEA, and by means of a key K1 stored in the service tool 9, to an encoded value K1 (Z1). The encoded value K1 (Z1) is transferred, together with the request to transfer the first transfer data, to the immobilizer control device. The immobilizer control device 5 calculates in the same manner from the random number Z1, with the aid of the encoding algorithm and the code K1 also stored in the immobilizer control device, the encoded value K1 (Z1) and compares this with the encoded value K1 (Z1), which was transferred from the service tool 9. If the two encoded values correspond, this means that the same key K1 is known to both devices, and the immobilizer control device 5 regards this service tool 9 as authorized to request the first transfer data. In this connection, provision is made for different keys $K1_i$ for different procedures, such as data reading procedures or data amendment procedures.

In step S105 the immobilizer control device 5 generates from the random number Z2, with the aid of an encoding algorithm, from a key K2 stored in the immobilizer control device, an encoded value K2 (Z2) and transfers this, together with the first transfer data, to the service tool 9. In the same manner, the service tool 9 generates from the random number Z2, with the aid of the encoding algorithm and the key K2 stored in the service tool, the encoded value K2 (Z2). If this encoded value K2 (Z2) corresponds to the encoded value K2 (Z2) transferred from the immobilizer control device 5, then the service tool 9 regards the first transfer data as authentic.

In order to prevent tampering with the data during the transfer, its integrity is assured in that a one-way hash function such as SHA1 is applied to the first transfer data, and the hash value produced is then sent together with the first transfer data. In order to prevent unauthorized reading of the first transfer data, it is cryptographically encoded by means of a first encoding process, in this case XTEA, and one of the keys K1 or K2 or another key.

If the service tool 9 has received the first transfer data, in step S106 further data is added to this first transfer data, such as an identification number of the service tool 9 and an identification number of the user of the service tool 9. This data is aggregated in step S107 to a file, encoded by a second encoding process, such as AES and a key K4 stored in the service tool 9, and stored as a request packet (second transfer data). The service tool 9 is separated from the agricultural tractor 1 and brought into an environment in which it can be connected via the data transfer network 11 to the server 12.

If it is determined in step S108 that the service tool is connected to the server 12, the request packet is then transferred in step S107 to the server 12. The transfer can take place, for example, by means of the protocols SMTP, FTP, HTTP or the like. The generation and transfer of the request packet is then terminated by the service tool 9.

Figure 5:
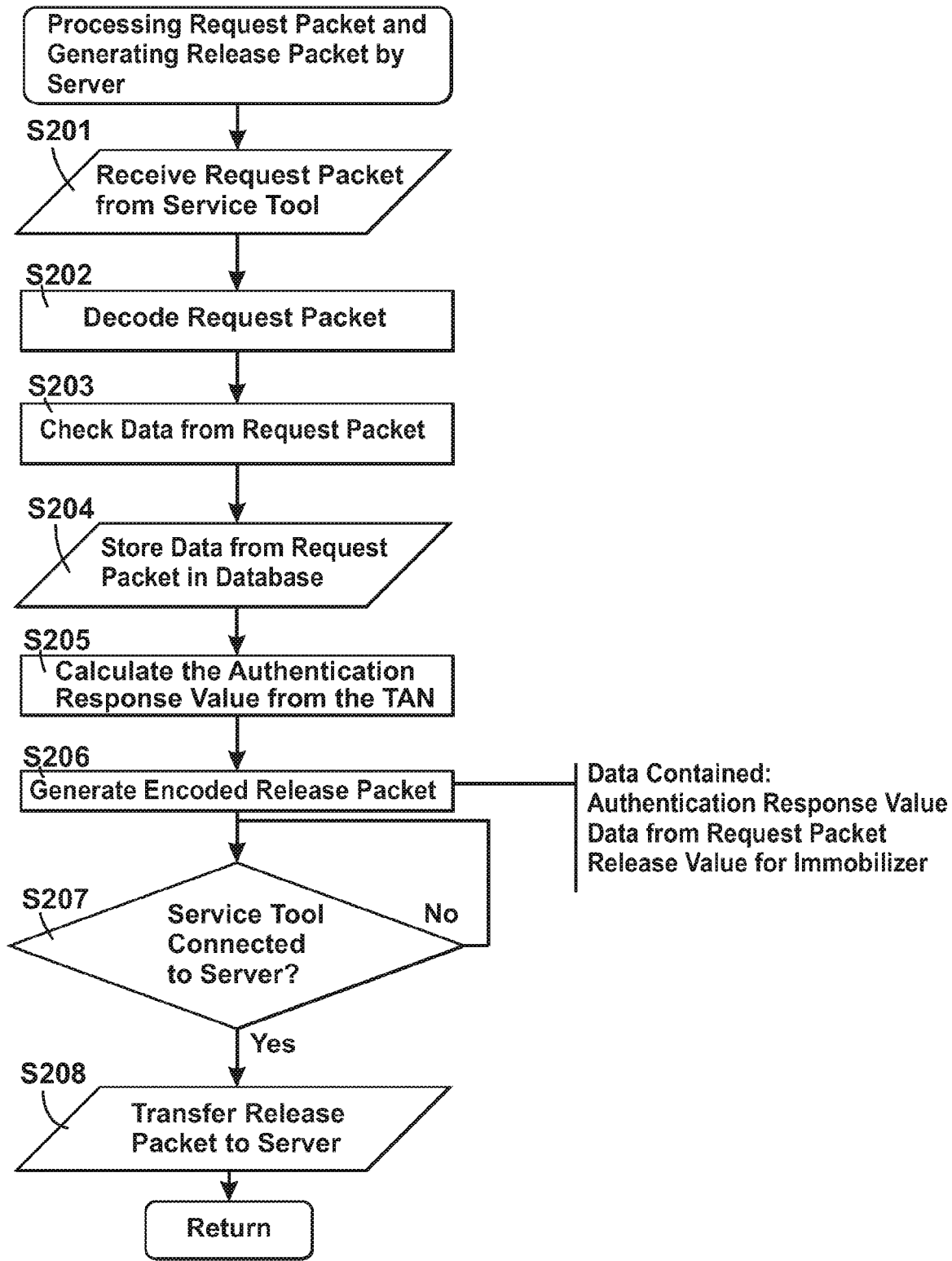
FIG. 5 shows a flow diagram for processing the request packet and generating a release package.

Referring to FIG. 5, processing of the request packet and generation of the release packet by the server 12 will be described.

In step S201 the request packet is received from the service tool 9 by the server 12. In step S202, the request packet is decoded on the server 12 by means of the reverse function of the second encoding process and the key K4, also stored on the server 12. In step S203 a check is made as to whether the user with the transferred service tool ID or the service tool 9 with the transferred service tool ID is authorized to make the desired changes to the immobilizer device 5. If this is the case, then in step S204 this decoded data from the request packet is stored in the database 13. Following on from this, in step S205, from the transferred TAN and with the aid of an encoding algorithm (generation function), in this case XTEA, and a key K3 stored on the server 12, the encoded value K3 (TAN) is calculated (authentication response value). In step S206, from the encoded value K3 (TAN), the service tool ID and the user ID from the request packet, the chassis number of the agricultural tractor 1 and release values, such as features of a new ignition key, new control data for the control data area 4 and reference control data for the reference data area 6 or data such as a key value for creating the state of learning readiness of the EMC 3, are aggregated to a file, encoded by means of the second encoding process and stored as a release packet (third transfer data). If it is determined in step S207 that the service tool 9 is still connected or is reconnected to the server 12, the data is transferred in step S208 to the service tool and processing of the request packet and generation of the release packet by the server 12 is ended. If it is determined that at this time there is no connection between the service tool 9 and the server 12, the system waits until the completion of a connection set-up, and the release packet is then transferred, for example by means of HTTP or FTP, and processing of the request packet and generation of the release packet by the server 12 is ended. As an alternative, however, the release packet can be transferred to an intermediate data-processing device, such as an SMTP server, not further described here, which, when connection of the service tool 9 is set up, terminates transfer of the release packet.

Figure 6:
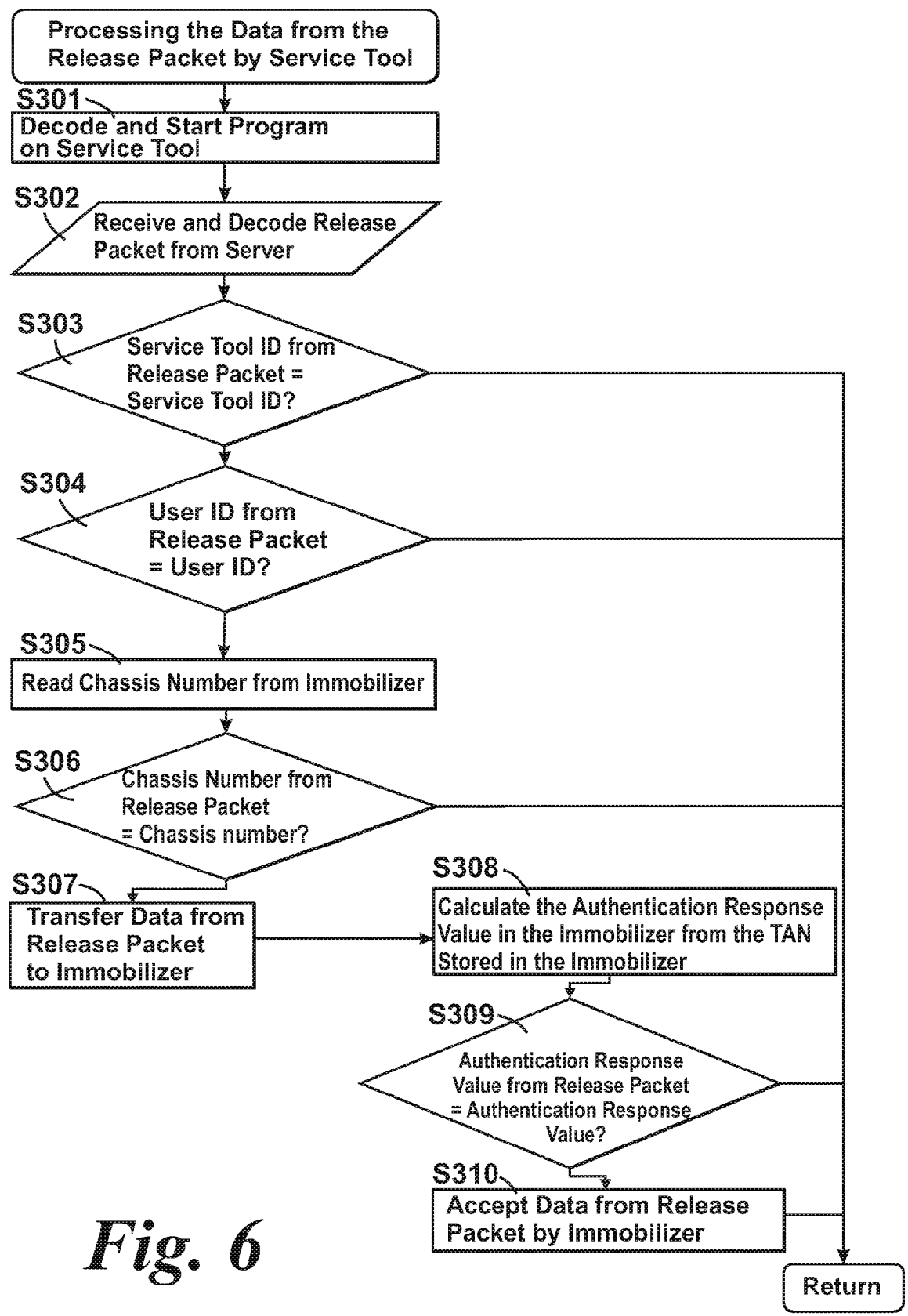
FIG. 6 shows a flow diagram of the data from the release packet being fed in, according to the embodiment.

Referring to FIG. 6, feeding in of data from the release packet by the service tool 5 will be described.

In step S301, the program is started on the service tool as in step S101. In step S302, the release packet is received by the server 12 and decoded. In step S303, the program checks whether the service tool ID from the release packet corresponds to the service tool ID of the service tool. If this is the case, the program checks whether the user ID from the release packet corresponds to the user ID of the user who is using the program. If this is the case, then in step S305 the chassis number from the immobilizer control device 5 is read by the service tool 9 in the same manner as in steps S104 and S105. If the chassis number from the release packet corresponds with the chassis number from the immobilizer control device, then the service tool 9 transfers the data from the release packet as fourth transfer data to the immobilizer control device 5. The transfer of the data takes place in the same manner as in steps S104 and S105. The immobilizer control device 5 calculates from the TAN, by means of an encoding process, in this case XTEA, and the key K3, also stored in the immobilizer control device, the encoded value K3 (TAN) and compares this with the encoded value K3 (TAN) from the fourth transfer data. If both values correspond, the data from the release packet will be accepted by the immobilizer control device 5, and, depending on the data, will be stored in the control data memory 4, the reference data memory 6, or the key feature memory 7. The release value for creating the learning readiness mode of the EMC 3 is transferred to the EMC 3 so that a serial number or a communication code transferred from the immobilizer control device 5 to the EMC 3 will be stored in the EMC 3, in order to identify the immobilizer control device and communicate with it, by means of which a start clearance can be effected. In conclusion, the learning readiness state will be terminated by the EMC 3 and the TAN deleted by the immobilizer control device.

It is clear to the person skilled in the art that there are other embodiments of the invention as well as the embodiment described.

Thus, for example, in this embodiment the encoding algorithm XTEA is used between the immobilizer control device 5 and the service tool 9 for the encoding and authentication. Other symmetrical encoding algorithms can also be used for this purpose. Instead of the encoding process for generating the encoded values K1 (Z1), K2 (Z2), a one-way hash function can also be used. The same also applies to the authentication between the immobilizer control device 9 and the server 12 with regard to the encoding algorithm for generating the encoded value K3 (TAN). To encode the communication between the service tool 9 and the server 12, in this embodiment AES is used as the encoding algorithm. Here too, any other reliable symmetrical encoding algorithm can be used. With regard to the use of an asymmetric encoding process or a hybrid process for the data, in this situation the known advantages of a public key infrastructure can be used.

In this embodiment, the reliable data transfer applied to a data exchange with the EMC 3 or the immobilizer control device 5. Instead of these devices, other devices can be considered, such as a vehicle management computer, an instrument cluster, or a central electrical device.

In this embodiment a random number was used as the TAN. In this connection, however, other data from the first transfer data can be used as the TAN, such as, for example, the serial number of the immobilizer control device with a time stamp.

We claim:

1. Data transfer system for programming motor vehicle control devices comprising: a immobilizer control device (5), located on a vehicle to control the immobilization of the vehicle, which is adapted to store data which is to be protected against unauthorized access; a motor vehicle service tool (9); and, a vehicle manufacturer server (12), which is adapted to receive data which is to be protected against unauthorized access and is to be transferred to the immobilizer control device (5); wherein the immobilizer control device (5) and the motor vehicle service tool (9) are adapted to be connected to one another via a first data transfer device and for data stored in the immobilizer control device (5) to be transferred as first transfer data to the motor vehicle service tool (9), wherein the motor vehicle service tool (9) and the vehicle manufacturer server (12) are adapted to bring the motor vehicle service tool (9) from an area at the immobilizer control device (5) into a spatial area in which the motor vehicle service tool (9) can be connected to the vehicle manufacturer server (12) indirectly or directly via a second data transfer device (11), to connect the motor vehicle service tool (9) and the vehicle manufacturer server (12) indirectly or directly via the second data transfer device (11) and transfer at least a part of the first transfer data from the motor vehicle service tool (9) to the vehicle manufacturer server (12) as second transfer data; wherein the vehicle manufacturer server (12) is adapted to generate an authentication response value from the first transfer data or a part thereof by means of a generating function; wherein the motor vehicle service tool (9) and the vehicle manufacturer server (12) are adapted to transfer the authentication response value and data stored in the vehicle manufacturer server (12) as third transfer data to the motor vehicle service tool (9); wherein the immobilizer control device (5) and the motor vehicle service tool (9) are adapted to transfer the authentication response value and the other third transfer data or part thereof to the immobilizer control device (5) as fourth transfer data; wherein the immobilizer control device (5) is adapted to check the correctness of the authentication value by means of the first transfer data or parts thereof and to process the fourth transfer data further; and when the immobilizer control device determines the authentication value is correct, the motor vehicle service tool is then capable of gaining protected access to the immobilizer control device.

2. Data transfer system according to claim 1, wherein the immobilizer control device, the motor vehicle service tool and the vehicle manufacturer server are adapted such that, before the transfer, a one-way hash function is applied to the first, second, third and/or fourth transfer data, and the hash value generated by this is appended to the first, second, third, and/or fourth transfer data.

3. Data transfer system according to claim 1, wherein the immobilizer control device, the motor vehicle service tool and the vehicle manufacturer server are adapted such that the first, second, third, and/or fourth transfer data are encoded.

4. Data transfer system according to claim 1, wherein the immobilizer control device and the motor vehicle service tool are adapted such that an authentication of the immobilizer control device or the motor vehicle service tool is carried out by means of a challenge-response process.

5. Data transfer system according to claim 1, wherein the generating function is a symmetrical encoding process or an encoding process without reverse function, and the immobilizer control device (5) is adapted to apply the generation function with the same input values to the first transfer data or a part thereof and to compare the result of this with the authentication response value.

6. Data transfer system according to claim 1, wherein the generating function is a symmetrical or asymmetrical encoding process and the immobilizer control device (5) is adapted to apply the reverse function of the generating function to the authentication response value and to compare the result of this with the first transfer data or parts thereof.

7. Data transfer system according to claim 1, wherein the vehicle manufacturer server (12) is adapted to store the second transfer data or parts thereof in the long term.

8. Data transfer system according to claim 1, wherein the first transfer data contains an authentication enquiry value and at least one of a chassis number, a drive engine control device serial number or immobilizer control device serial number, a representation of a ceiling curve, an equipment list and a chassis number.

9. Data transfer system according to claim 1, wherein the second transfer data additionally contains at least one value from an identification value of the motor vehicle service tool and an identification value of the user of the motor vehicle service tool (9).

10. Data transfer system according to claim 1, wherein the third transfer data contains a main key for creating a learning readiness mode of a drive engine control device (3) and the immobilizer control device is connected to the drive engine control device and the drive engine control device is adapted to create a learning readiness state for acquisition of the immobilizer control device.

11. Data transfer system according to claim 1, wherein the third transfer data contains a representation of a ceiling curve and the immobilizer control device (5) is adapted to process the ceiling curve.

12. Data transfer system according to claim 1, wherein the third transfer data contains the second transfer data or parts thereof and the motor vehicle service tool (9) is adapted to check whether the second transfer data or parts thereof correspond to the second transfer data which was transferred with the third transfer data.

13. Data transfer system according to claim 1, wherein the immobilizer control device (5) and the motor vehicle service tool (9) are adapted: to request an authentication enquiry value by the motor vehicle service tool (9) at the immobilizer control device (5); to generate and store a pseudo-random number as an authentication enquiry value by the immobilizer control device (5); and, to transfer the first transfer data to the motor vehicle service tool (9).

14. Data transfer system according to claim 1, wherein the motor vehicle service tool (9) is adapted: to aggregate the second transfer data to an encoded file; and, to transfer the encoded file as second transfer data to the vehicle manufacturer server (12).

15. Data transfer system according to claim 1, wherein the motor vehicle service tool (9) and the vehicle manufacturer server (12) are adapted to transfer the second transfer data or third transfer data respectively by means of SMTP, HTTP, or FTP.

16. Data transfer system according to claim 1, wherein immobilizer control device (5) is part of an agricultural utility vehicle, in particular an agricultural tractor.

17. Motor vehicle control device data transfer process comprising: (a) transfer of data stored in a immobilizer control device , the immobilizer control device being located on a vehicle to control the immobilization of the vehicle, as the first transfer data from the immobilizer control device (5) to a motor vehicle service tool (9); (b) bringing motor vehicle service tool into a spatial area in which the motor vehicle service tool can be connected to a vehicle manufacturer server (12) indirectly or directly via a data transfer device (11); (c) transfer of at least a part of the first transfer data from the motor vehicle service tool (9) to the vehicle manufacturer server (12) as second transfer data; (d) generation of an authentication response value from the first transfer data or a part thereof by the vehicle manufacturer server (12) by means of a generation function; (e) transfer of the authentication response value and data stored in the vehicle manufacturer server (12) as third transfer data from the vehicle manufacturer server (12) to the motor vehicle service tool (9); (f) transfer of the authentication response value and the remaining third transfer data or a part thereof as fourth transfer data from the motor vehicle service tool (9) to the immobilizer control device (5); (g) checking the correctness of the authentication response value by means of the first transfer data or parts thereof by the immobilizer control device (5); and (h) granting protected access to the immobilizer control device by the motor vehicle service too when the immobilizer control device determines the authentication value is correct.

18. Process according to claim 17, wherein, in steps (a), (c), (e) and/or (f), before the transfer, a one-way hash function is applied to the first, second, third, and/or fourth transfer data, and the hash value generated in this way is appended to the first, second, third, and/or fourth transfer data.

19. Process according to claim 17, wherein, in steps (a), (c), (e) and/or (f), the first, second, third, and/or fourth transfer data are encoded.

20. Process according to claim 17, wherein, in steps (a) and/or (f), an authentication is carried out by the immobilizer control device or the motor vehicle service tool (5; 9) respectively by means of a challenge-response process.

21. Process according to claim 17, wherein the generating function is a symmetrical encoding process or an encoding process without reverse function, and step (g) comprises applying the generating function with same input values to the first transfer data or part thereof, and comparing the result from this with the authentication response value.

22. Process according to claim 17, wherein the generating function is a symmetrical or asymmetrical encoding process, and step (g) comprises applying the reversing function of the generating function to the authentication response value and comparing the result from this with the first transfer data or parts thereof.

23. Process according to claim 17, wherein after step (c) or (d) the following step is carried out: long-term storage of the second transfer data or parts thereof.

24. Process according to claim 17, wherein the first transfer data contains an authentication enquiry value and at least one value from a chassis number, a drive engine control device serial number or immobilizer control device serial number, a representation of a ceiling curve, an equipment list, and a chassis number.

25. Process according to claim 17, wherein the second transfer data additionally contains at least one value from an identification value of the motor vehicle service tool (9) and an identification value of the user of the motor vehicle service tool (9).

26. Process according to claim 17, wherein the third transfer data contains a main key for creating a learning readiness mode of a drive engine control device connected to the immobilizer control device, and after step (h), creating the learning readiness mode of the drive engine control device wherein the drive engine control device will be configured to communicate with the immobilizer control device.

27. Process according to claim 17, wherein the third transfer data contains a representation of a ceiling curve, and after step (h), processing the ceiling curve in the immobilizer control device or a drive engine control device connected to the immobilizer control device.

28. Process according to claim 17, wherein the third transfer data contains the second transfer data or parts thereof, and after step (e), checking by the motor vehicle service tool (9) as to whether the second transfer data or parts thereof correspond to the second transfer data which was transferred with the third transfer data.

29. Process according to claim 17, wherein step (a) comprises the following substeps: requesting an authentication enquiry value by motor vehicle service tool (9) at the immobilizer control device (5); generating a pseudo-random number as an authentication enquiry value and storage of this by the immobilizer control device (5); and, transferring the first transfer data from the immobilizer control device (5) to the motor vehicle service tool (9).

30. Process according to claim 17, wherein step (c) comprises of the following substeps: aggregating the second transfer data to one encoded file; and, transferring the encoded file as second transfer data to the vehicle manufacturer server (12).

31. Process according to claim 17, wherein, in steps (c) and (d) the second transfer data or third transfer data respectively is transferred by means of SMTP, HTTP, or FTP.

32. Process according to claim 17, wherein the immobilizer control device (5) is part of an agricultural utility vehicle, in particular an agricultural tractor.

* * * * *